United States Patent
Urata et al.

(10) Patent No.: US 7,379,261 B2
(45) Date of Patent: May 27, 2008

(54) APPARATUS AND METHOD FOR REPRODUCING RECORDED SIGNAL

(75) Inventors: Kaoru Urata, Kanagawa (JP); Hiroshi Saito, Kanagawa (JP)

(73) Assignee: Sony Corporation (JP)

( * ) Notice: Subject to any disclaimer, the term of this patent is extended or adjusted under 35 U.S.C. 154(b) by 942 days.

(21) Appl. No.: 10/805,310

(22) Filed: Mar. 22, 2004

(65) Prior Publication Data

US 2004/0197077 A1    Oct. 7, 2004

(30) Foreign Application Priority Data

Apr. 4, 2003   (JP)   ............................ P2003-101388

(51) Int. Cl.
    *G11B 5/584*   (2006.01)
(52) U.S. Cl. .................................. 360/77.12
(58) Field of Classification Search ............. 360/77.12, 360/75, 69, 77.08, 73.08, 73.12, 30.13, 44.29
    See application file for complete search history.

(56) References Cited

U.S. PATENT DOCUMENTS

| | | | |
|---|---|---|---|
| 3,134,074 A | | 5/1964 | Litke |
| 4,608,611 A | * | 8/1986 | Ota .............................. 386/23 |
| 5,247,499 A | * | 9/1993 | Hayashi et al. .......... 369/30.13 |
| 5,481,417 A | * | 1/1996 | Yokoyama et al. ...... 360/73.08 |
| 5,905,603 A | * | 5/1999 | Ogasawara et al. ...... 360/77.08 |
| 6,240,055 B1 | * | 5/2001 | Takamine et al. ........ 369/44.29 |
| 7,095,582 B2 | * | 8/2006 | Kitahara .................. 360/77.12 |

FOREIGN PATENT DOCUMENTS

| | | |
|---|---|---|
| EP | 0 655 735 | 5/1995 |
| JP | 06-084239 | 3/1994 |
| JP | 07-141725 | 6/1995 |
| JP | 11-283226 | 10/1999 |
| JP | 3252989 | 11/2001 |
| JP | 3271198 | 1/2002 |
| WO | WO99/52100 | 10/1999 |

OTHER PUBLICATIONS

Japanese Office Action; Application No. 2003-101388; Dated Oct. 24, 2006.

* cited by examiner

*Primary Examiner*—Fred F. Tzeng
(74) *Attorney, Agent, or Firm*—Rader Fishman & Grauer PLLC; Ronald P. Kananen

(57) ABSTRACT

In an apparatus and a method for reproducing recorded signal related to this invention, a dynamic tracking head having two gaps, which deviate from each other traces a single track. Optimum dynamic tracking control is performed using track ID and a differential between envelope signals, which is a signal reproduced from the two gaps, and DC wobbling error. Thus, it controls the position of a reproducing head to a target track position.

6 Claims, 11 Drawing Sheets

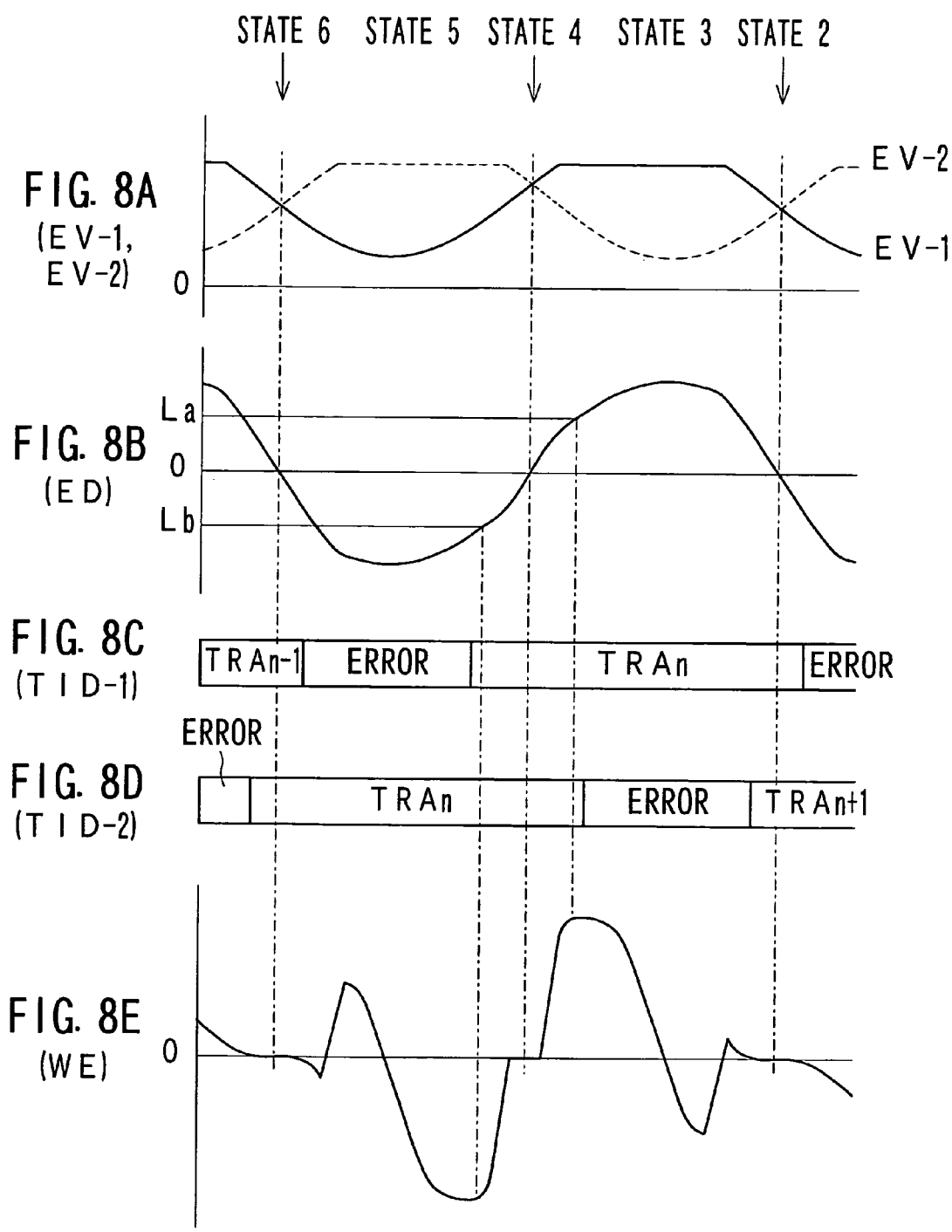

(ED)

(ED)

Pof (WE)

0

(AMOUNT OF OFF TRACK)

APPARATUS AND METHOD FOR REPRODUCING RECORDED SIGNAL

BACKGROUND OF THE INVENTION

1. Field of the Invention

The present invention relates to an apparatus and a method for reproducing recorded signal. More specifically, it relates to an apparatus and a method for reproducing recorded signal applicable to a video tape recorder that is capable of reproducing a signal recorded in a magnetic tape.

2. Description of Related Art

A narrow track system has been developed as a means for improving recording density in an apparatus for reproducing recorded signal, for example, a video tape recorder capable of reproducing a signal recorded in a magnetic tape. If this narrow track system has been developed, tracking for tracing a recorded track with the reproducing head accurately needs to be carried out rapidly at a high precision. For this purpose, there are provided a pair of reproducing heads for reproducing two tracks recorded at the same time simultaneously, a wobbling means for wobbling the reproducing head at a predetermined amplitude, a reproduction reference envelope signal extracting means for extracting an envelope signal of a reproduction reference signal outputted from the reproduction head and a wobbling component extracting means for extracting a wobbling component from the reproduction reference envelope signal. Consequently, an amount of off-track (quantity of deviation of a traced position from a target track) of a reproducing head can be detected rapidly at a high precision without using the deviation amount of the reproducing head.

If the amount of off track and wobbling component turn into the characteristic indicated in FIG. 1 when tracing a target track with the reproducing head by extracting the wobbling component and performing a control to eliminate a wobbling error, the target track cannot be traced properly even if the trace position of the reproducing head is controlled so as to eliminate the wobbling error. For example, unless the amount of off track is within a region TEW as shown in FIG. 1, the reproducing head is controlled to be located at an off-track amount PD1 or off-track amount PD2 so that a pseudo lock is generated. Consequently, the reproducing head cannot be controlled to the target track position in which the amount of off track is "0".

Accordingly, an object of the present invention is to provide an apparatus and a method for reproducing recorded signal wherein controlling the position of the reproducing head to a target track position is allowed without generating the pseudo lock.

SUMMARY OF THE INVENTION

According to an aspect of the present invention, there is provided an apparatus for reproducing recorded signal. The apparatus comprises a head assembly including a plurality of reproducing heads for each track such that they deviate from each other in a track width direction. The apparatus also comprises a driving device for driving the head assembly in the track width direction. The apparatus further comprises a reproduction signal processor for detecting track identification information of a traced track according to a reproduction signal obtained by the plurality of reproducing heads for each reproducing head. The driving device drives the head assembly in the track width direction using the track identification information so that the plurality of reproducing heads trace a target track.

According to another aspect of the present invention, there is provided a method for reproducing recorded signal wherein a head assembly includes a plurality of reproducing heads for a track such that the reproducing heads deviate from each other in a track width direction. The method comprises the step of detecting track identification information of a traced track according to a reproduction signal obtained by the plurality of reproducing heads for each reproducing head. The method also comprises the step of driving the head assembly in the track width direction using the track identification information for the plurality of reproducing heads to trace a target track.

According to the present invention, a plurality of reproducing heads is provided for a track such that the heads deviate in the track width direction to complete a head assembly. Track identification information of the traced track is detected from the reproduction signals obtained by the reproducing heads for each reproducing head. The head assembly is driven in the track width direction so that the plurality of reproducing heads can trace a target track. This enables the off track allowance to be expanded with the special reproduction function being maintained and the target track to be reproduced by the plural reproducing heads quickly.

Additionally, the head assembly is wobbled at a predetermined amplitude in the track width direction so that the differential between the envelope signals of the reproduction signals is limited to a predetermined range. The head assembly is further driven in the track width direction so as to eliminate a wobbling error detected using the envelope signals. This allows the target track to be traced at a high precision.

Additionally, the differential between the envelope signals is obtained, the head assembly is driven in the track width direction so that the differential falls under the predetermined range and after that, the head assembly is further driven in the track width direction so as to eliminate the wobbling error. This allows the target track to be traced quickly at a high precision.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 8A to 8E are diagrams each for explaining the operation of the driving section;

DESCRIPTION OF THE PREFERRED EMBODIMENTS

Figure 1:
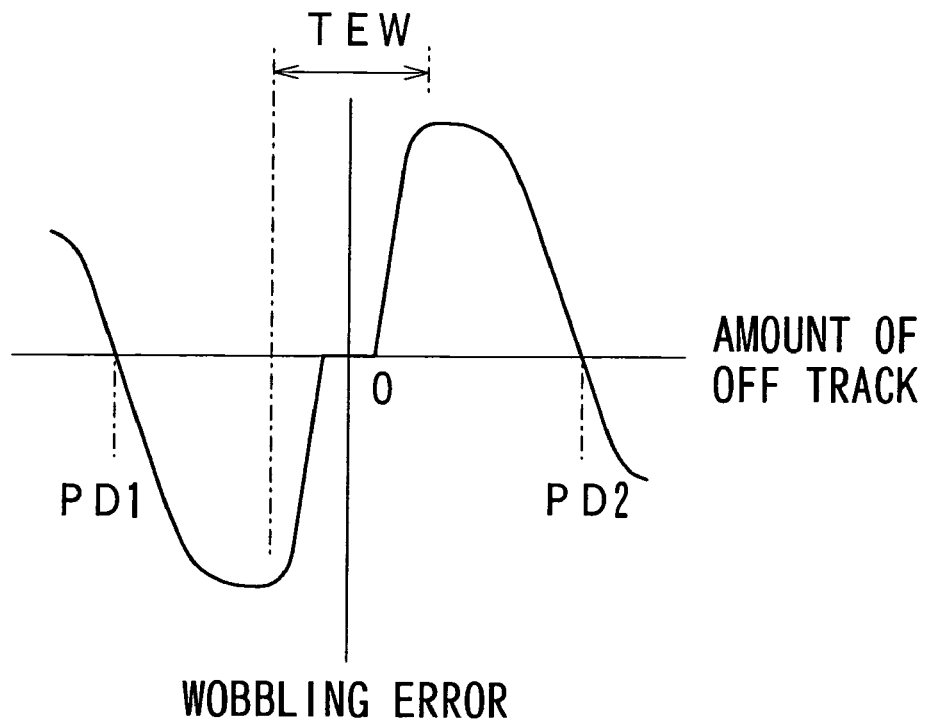
FIG. 1 is a diagram for showing the relationship between an amount of off track and a wobbling error.
Figure 2:
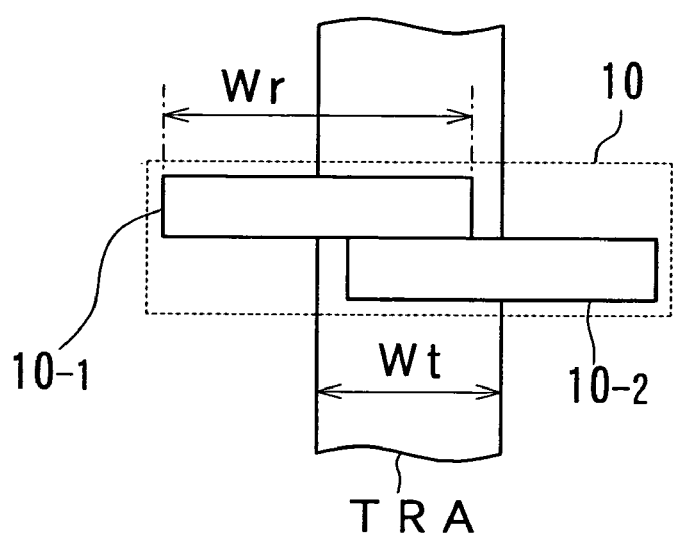
FIG. 2 is a diagram for showing configuration of the head assembly.

Hereinafter, a preferred embodiment of the present invention will be described with reference to the accompanying drawings. FIG. 2 shows a head assembly 10 for use in the recording signal reproducing apparatus of the present invention. The head assembly 10 has a plurality of reproducing heads for a single track TRA such that their positions deviate in the track width direction. For example, a reproducing head 10-1 and a reproducing head 10-2 are provided for a track TRA. The reproducing head 10-2 is provided such that it deviates from the reproducing head 10-1 in the width direction of the track TRA. Meanwhile, the head assembly 10 may be so constructed by disposing a plurality of head gaps within a single reproducing head with the head gaps deviating from each other in the track width direction. For a subsequent description, a case where a plurality of reproducing heads is provided will be described.

This head assembly 10 is installed through an actuator such as a piezoelectric element and driven in the track width direction by the actuator. The reproducing head that is driven in the track width direction is called dynamic tracking head (DT head). This DT head is driven in the track width direction by the actuator based on a drive signal generated corresponding to an amount of off track and even at the time of special reproducing operation, its reproducing head traces a target track properly so as to achieve noiseless reproduction.

The track width Wr of a head gap in each of the reproducing heads 10-1, 10-2 is so constructed to be wider than the track width Wt of the track TRA. The deviation amount in the track width direction of the reproducing head 10-2 with respect to the reproducing head 10-1 is set up so that even if the trace position of the reproducing head 10-1 deviates in the track width direction to refrain a signal of the track TRA from being reproduced properly, the reproducing head 10-2 can trace the track TRA to reproduce a signal of the track TRA properly.

Figure 3:
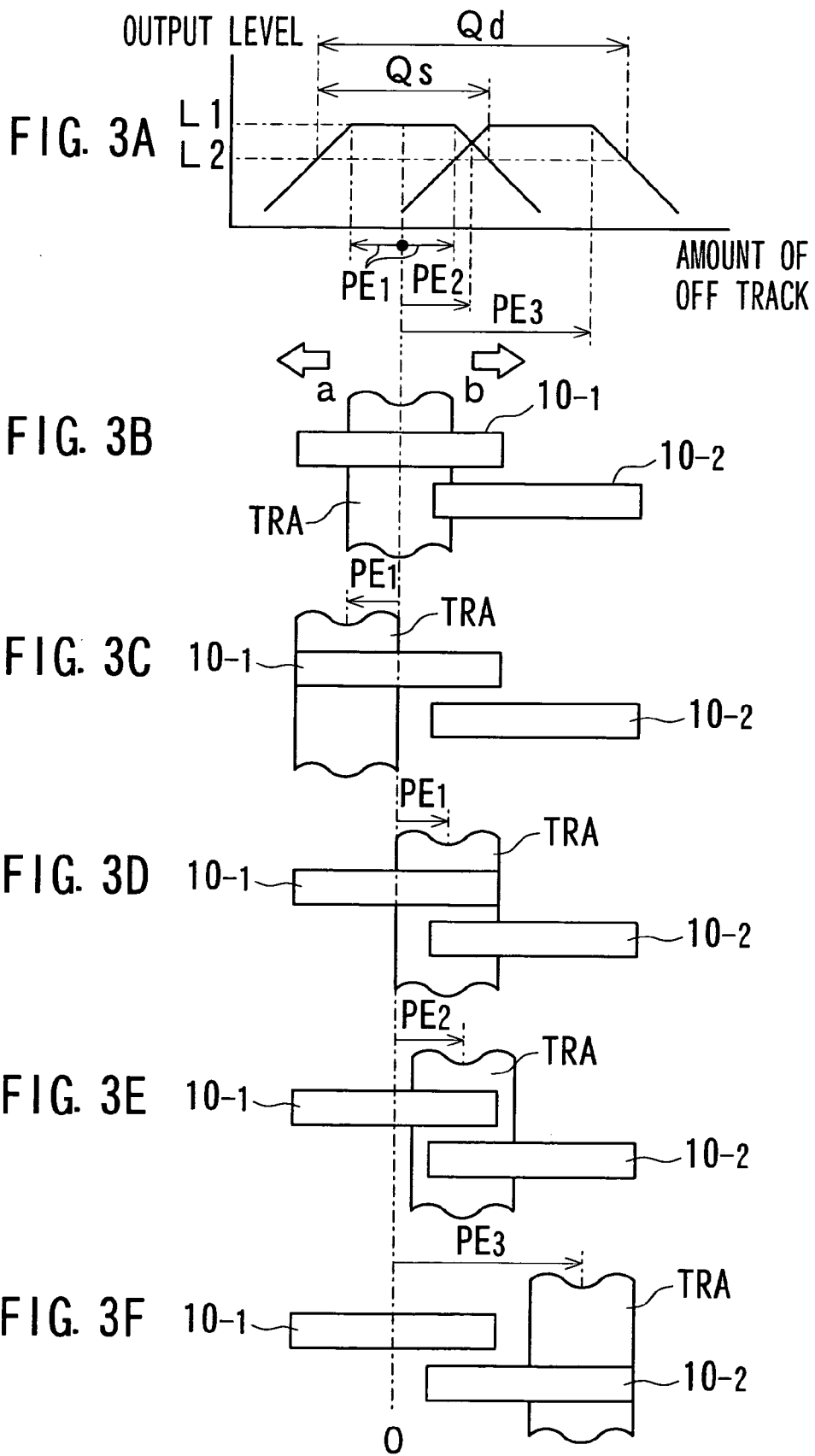
FIGS. 3A to 3F are diagrams each for showing a relationship between an output level of a reproducing head and an amount of off track.

FIGS. 3A to 3F show a relationship between an output level of the reproducing head and an amount of off track. Here, for simplification of a subsequent explanation, in a case where a center of the reproducing head 10-1 is equal to that of the track TRA as shown in FIG. 3B, it is assumed that an amount of off track is "0".

When the amount of off track is "0", the output level of the reproducing head 10-1 indicates level L1 as indicated in FIG. 3A. If a position of the track TRA deviates in the direction of an arrow "a" from the reproducing head 10-1 so that it becomes larger than the amount of off track PE1 indicated in FIG. 3C, the track TRA leaves the reproducing head 10-1. Thus, as indicated in FIG. 3A, as the amount of off track increases, the output level of the reproducing head 10-1 is lowered. Likewise, if a position of the track TRA deviates in the direction of an arrow "b", which is opposite to the direction of the arrow "a" from the reproducing head 10-1 so that it becomes larger than the amount of off track PE1 indicated in FIG. 3D, the track TRA leaves the reproducing head 10-1. Thus, as indicated in FIG. 3A, as the amount of off track increases, the output level of the reproducing head 10-1 is lowered.

If the amount of off track is PE2 as shown in FIG. 3E and the track width covered by the reproducing head 10-1 becomes substantially equal to the track width covered by the reproducing head 10-2, their output levels become equal when the output characteristics of the reproducing heads 10-1, 10-2 are equal.

If the track TRA is further moved in the direction of the arrow "b" so that the amount of off track indicated in FIG. 3F becomes larger than PE3, the track TRA leaves the reproducing head 10-2. Thus, as indicated in FIG. 3A, as the amount of off track increases, the output level of the reproducing head 10-2 is lowered.

Thus, if it is assumed that an off track range exceeding an output level "L2" is off track allowance, the reproducing head 10-1 and the reproducing head 10-2, a position of which deviates from that of the reproducing head 10-1 in the track width direction, are provided. A reproducing head whose output level becomes larger than the "L2" when a target track is being reproduced is regarded as a reproducing head which performs appropriate tracing. Thus, a signal obtained through such the reproducing head is selected for usage. At this time, the off track allowance turns to "Qd", which can expand the off track allowance wider than an off track allowance "Qs" obtained when a single reproducing head is used.

As shown in FIG. 3E, if the position deviation amount of the reproducing head is so set up that the output level when the track widths covered by the reproducing head 10-1 and the reproducing head 10-2 are substantially equal is level "L2", the off track allowance can be set to its maximum level. Additionally, if the position when the track widths covered by the reproducing head 10-1 and the reproducing head 10-2 are substantially equal to each other is assumed to be "0", the off track allowance to a position deviation in the direction of an arrow "a" of the track TRA can be made substantially equal to the off track allowance to a position deviation in the direction of the arrow "b".

Figure 4:
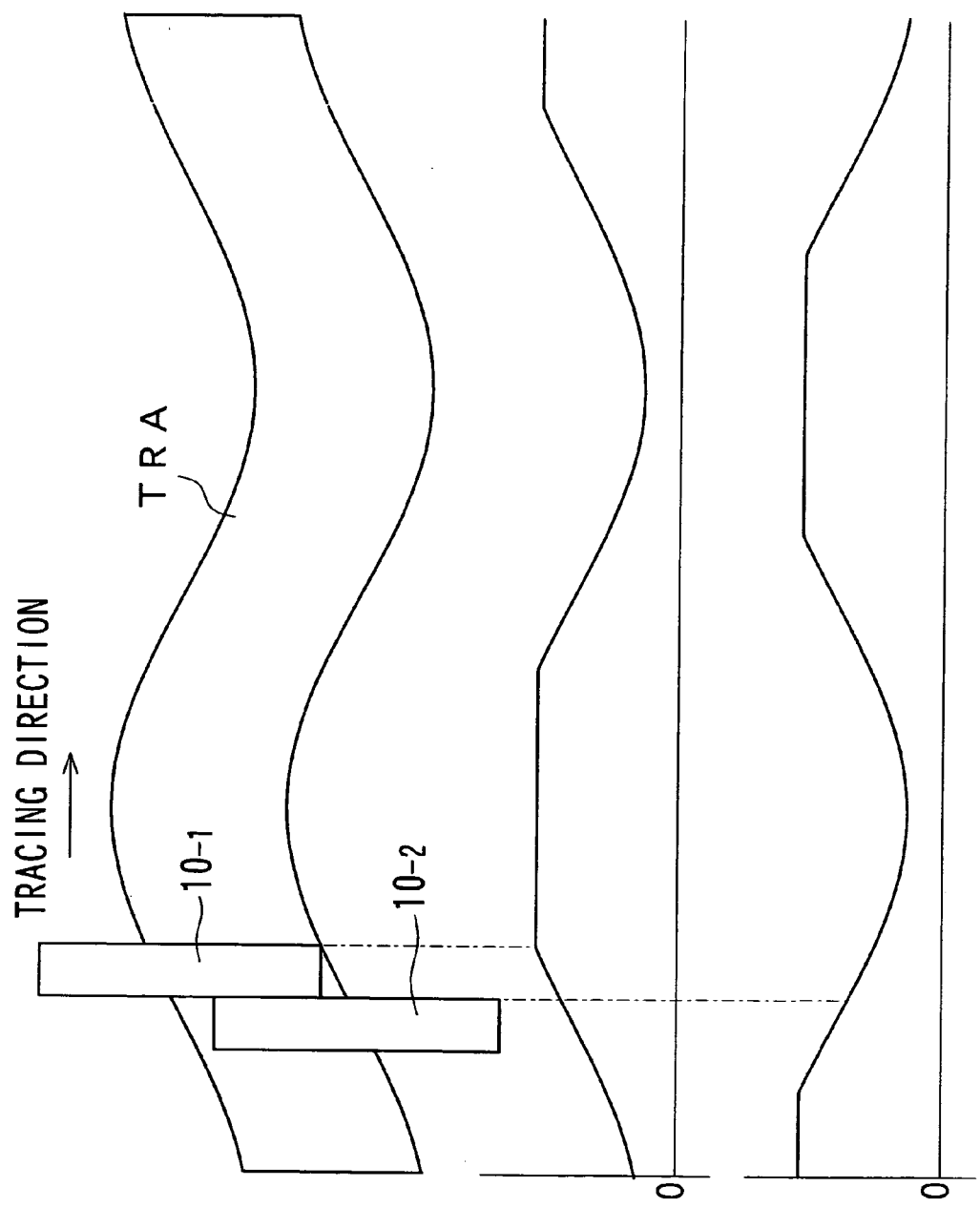
FIGS. 4A to 4C are diagrams each for explaining track reproducing state.

FIGS. 4A to 4C show a track reproduction condition when the reproducing head 10-1 and the reproducing head 10-2 reproduce the track TRA. FIG. 4A shows schematically the track TRA and the reproducing heads 10-1, 10-2. When the reproducing head 10-1 reproduces the track TRA in which such a curve is generated, the output level of the reproducing head 10-1 stays as indicated in FIG. 4B. That is, the output level of the reproducing head 10-1 turns into a level corresponding to the width of the track TRA traced. When the reproducing head 10-2 reproduces the track TRA, the output level of the reproducing head 10-2 stays as indicated in FIG. 4C. That is, the output level of the reproducing head 10-2 turns into a level corresponding to the width of the track TRA traced. A reproducing head whose tracing condition for the track TRA is appropriate is determined based on the output levels of the reproducing heads 10-1, 10-2. A reproduction signal obtained by the reproducing head that is determined to be an appropriate reproducing head is then selected successively. This allows an apparatus for reproducing recorded signal, which has a wide off track allowance, to be achieved.

Figure 5:
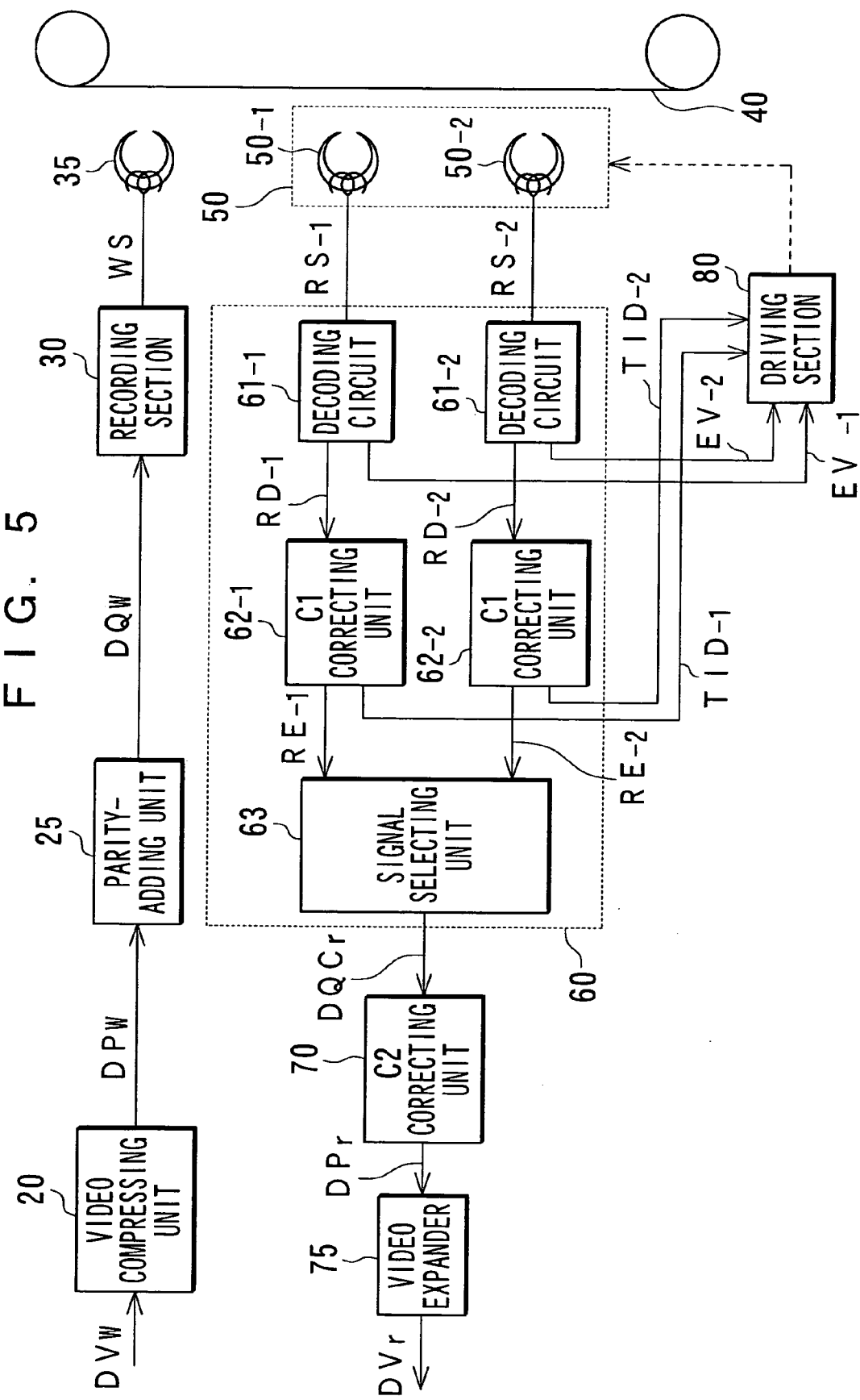
FIG. 5 is a diagram for showing a configuration of a video tape recorder.

FIG. 5 shows a configuration of the apparatus for reproducing recorded signal of the present invention in a case where it is applied to a video tape recorder.

Digital recording video signal $DV_w$ is compressed by a video compressing unit 20 according to moving picture experts group (MPEG) format. A parity-adding unit 25 receives it as coding data $DP_w$.

The parity-adding unit 25 generates an error correction code to coding data $DP_w$ and adds it thereto. For example, when a Reed-Solomon code whose code length is "Nc" and whose information quantity is "KNc" is generated as internal code parity C1 while a Reed-Solomon code whose code length is "Mc" and whose information quantity is "KMc" is generated as external code parity C2, coded data $DP_w$ is written by only a code length of "KNc" in the horizontal direction of a memory (not shown). Each time when writing by the code length of "KNc" is executed, the write position is moved in the vertical direction and data is written by the code length of "KNc" in the horizontal direction and by the code length of "KMc" in the vertical direction. After that, memory data is read out successively in the vertical direction and the external code parity C2 is computed. Next, memory data is read successively in the horizontal direction and the internal code parity C1 is computed. Further, the external code parity C2 for the information quantity "KMc" generated in the vertical direction is read out in the horizontal direction so as to generate the internal code parity C1 to the external code parity C2. The internal code parity C1 and the external code parity C2 that are generated in this way are added to the coded data $DP_w$ to generate the coded data $DQ_w$.

Further, a recording unit 30 adds synchronous code and identification code to the coded data $DQ_w$ generated by the parity adding unit 25 so as to generate recording data WD for each track. Further, the recording data WD is subjected to channel coding and then an obtained signal is converted to recording current WS and supplied to a recording head 35 loaded on a rotary drum.

The recording head 35 records signals on a magnetic tape 40 according to helical scanning method so as to form a track TRA. In the meantime, the track TRB has a predetermined azimuth angle with respect to the adjacent track TRA.

Figure 6:
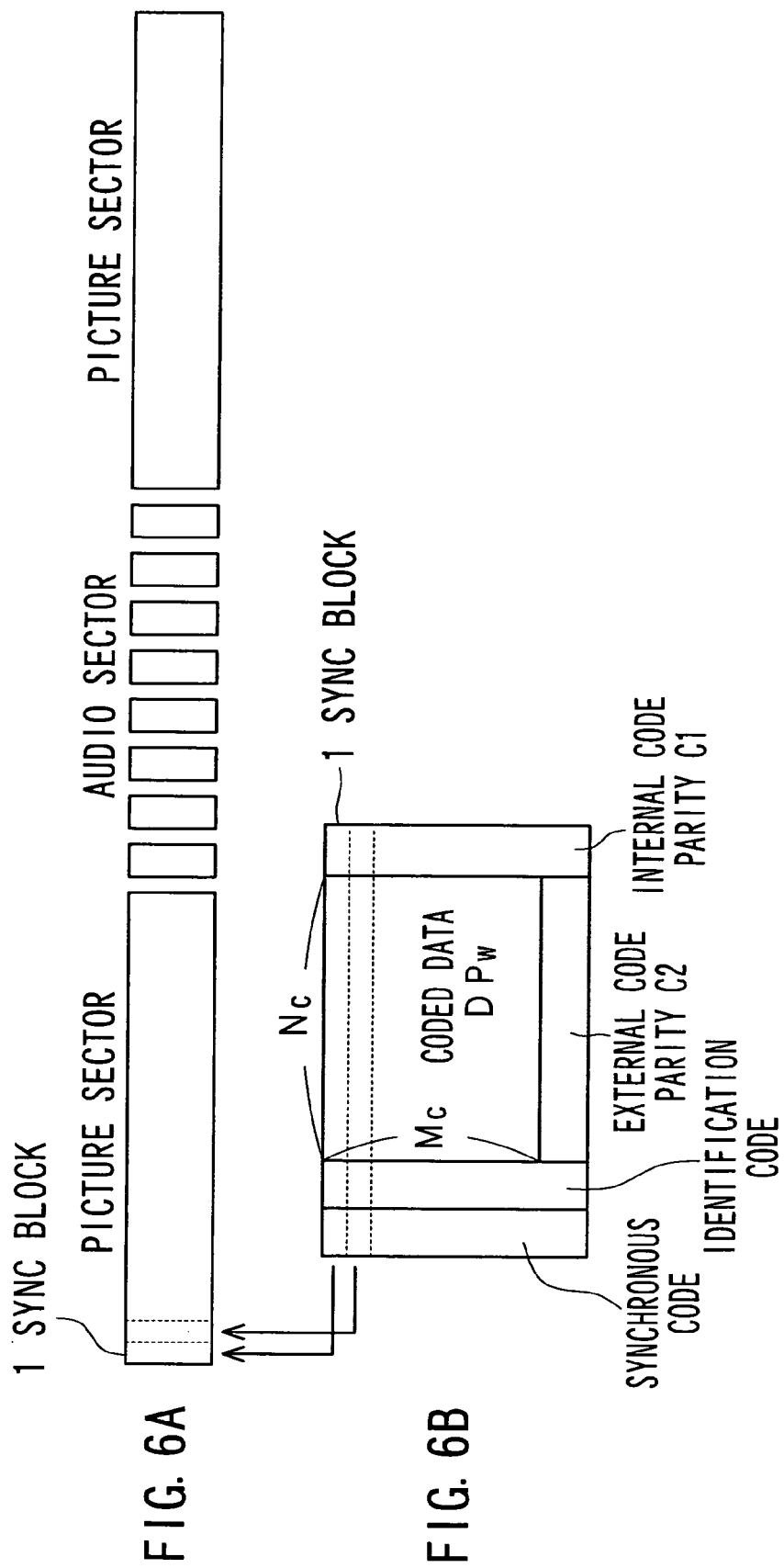
FIGS. 6A and 6B are diagrams each for explaining track pattern.

FIG. 6 is a diagram for explaining a pattern of the track TRA. The track TRA includes a picture sector for recording picture data and an audio sector for recording audio data as shown in FIG. 6A. Although FIG. 6A indicates a case where the audio sector is provided between the picture sectors, the picture sector may be provided between the audio sectors. Further, it is permissible to provide an edit gap between the picture sector and the audio sector or between the audio sectors so as to enable picture or audio data to be rewritten independently when picture or audio data is edited.

FIG. 6B shows a configuration of the recording data WD. The external code parity C2 computed for each coded data $DP_w$ of Mc bytes is added to the coded data $DP_w$ of Mc×Nc bytes. Further, the internal code parity C1 computed for each coded data $DP_w$ of Nc bytes or each external code parity C2 of Nc bytes is added thereto so as to generate coded data $DQ_w$. A synchronous code and identification code are added to each coded data $DQ_w$ consisting of this Nc-byte coded data $DP_w$ and the computed internal code parity C1 or the synchronous code and identification code are added to each coded data $DQ_w$ consisting of the Nc-byte external code parity C2 and computed internal parity C1 so as to produce recording data of a sync block. The recording signal WS based on the recording data of this sync block unit is supplied to the recording head 35 where it is recorded on the magnetic tape 40 so as to construct a picture sector. The identification code mentioned here includes a track identification information TID which is set up to enable each track to be identified, and a segment identification information SID which is set up to determine which segment the track belongs to. In the meantime, the audio sector can be formed in the same way as the picture sector although not shown.

In FIG. 5, a signal recorded in the magnetic tape 40 is read out by the DT head 50 attached to the rotary drum through an actuator such as a piezoelectric element as described above. In the DT head 50, two reproducing heads 50-1, 50-2 are provided for a single track such that they deviate from each other in the track width direction as described above. Further, the actuator in the driving section 80 is driven corresponding to an amount of off track with respect to a target track and even at the time of special reproducing operation, the reproducing heads 50-1, 50-2 are driven in the track width direction so as to trace the target track.

A decoding circuit 61-1 in a reproduction signal processing section 60 receives a reproduction signal RS-1 obtained by the reproducing head 50-1. The decoding circuit 61-1 executes waveform shaping by adjusting the amplitude and phase of the reproduction signal RS-1 and executes decoding processing corresponding to the channel coding which has been carried out in the recording section 30 so as to generate reproduction data RD-1. A C1 correcting unit 62-1 receives the reproduction data RD-1. Further, the decoding circuit 61-1 also generates an envelope signal EV-1 indicating an envelope of the reproduction signal RS-1 and supplies it to the driving section 80.

A decoding circuit 61-2 in the reproduction signal processing section 60 receives a reproduction signal RS-2 obtained by the reproduction head 50-2. The decoding circuit 61-2 executes waveform shaping by adjusting the amplitude and phase of the reproduction signal RS-2 like the decoding circuit 61-1 and further executes decoding processing so as to generate reproduction data RD-2. A C1 correcting unit 62-2 receives the reproduction data RD-2. The decoding circuit 61-2 also generates an envelope signal EV-2 indicating an envelope of the reproduction signal RS-2 and supplies it to the driving section 80.

The C1 correcting unit 62-1 corrects an error using the internal code parity C1 contained in coded data DQr-1 that configures the reproduction data RD-1 and notifies a signal selecting unit 63 of error correcting result CK-1. The reproduction data subjected to the error correction is supplied to the signal selecting unit 63 as the reproduction data RE-1. If the error correction result CK-1 is supplied to the signal selecting unit 63 in a form in which it is buried in the reproduction data RE-1 as a notice about the error correction result CK-1, the error correction result CK-1 and reproduction data RE-1 can be supplied to the signal selecting unit 63 as a single signal stream. Further, the C1 correcting unit 62-1 extracts track identification information TID-1 from the reproduction data RD-1 and supplies it to the driving unit 80.

The C1 correcting unit 62-2 corrects errors using the internal code parity C1 contained in the coded data DQr-2 which configures the reproduction data RD-2 like the C1 correcting unit 62-1 and supplies reproduction data subjected to the error correction and the reproduction data RE-2 indicating the error correction result CK-2 to the signal selecting unit 63. Further, track identification information TID-2 is extracted from the reproduction data RD-2 and supplied to the driving unit 80. In the meantime, the decoding circuits 61-1, 61-2 may extract the track identification information TID-1, TID-2.

The signal selecting unit 63 selects coded data DQr-1, DQr-2 subjected to error correction using the error correction results CK-1, CK-2 supplied from the C1 correcting units 62-1, 62-2 and supplies it to the C2 correcting unit 70 as coded data DQCr. The coded data DQr-1, DQr-2 subjected to the error correction may be selected using track identification information TID-1, TID-2 and the like extracted from the error correction results CK-1, CK-2 and the reproduction data subjected to the error correction.

The C2 correcting unit 70 corrects errors using the external code parity C2 contained in the coded data DQCr and supplies the coded data DPr subjected to the error correction to a video expander 75. The video expander 75 decodes the coded data DPr thus supplied and outputs it as digital reproduction video signal DVr.

Figure 7:
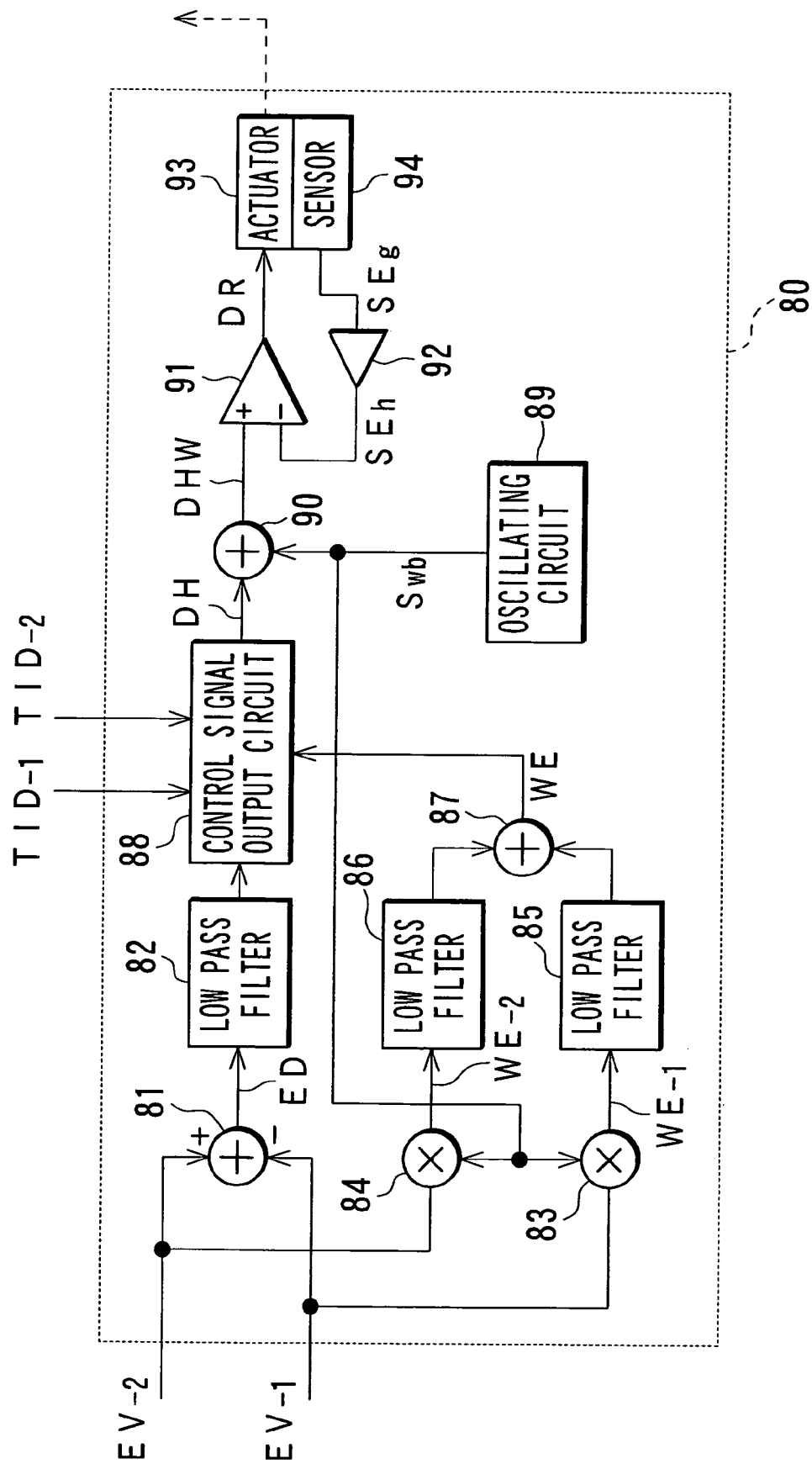
FIG. 7 is a diagram for showing a configuration of a driving section.

FIG. 7 shows a configuration of the driving section 80. A subtracter 81 and a multiplier 83 receive the envelope signal EV-1 from the decoding circuit 61-1. Further, the subtracter 81 and a multiplier 84 receive the envelope signal EV-2 from the decoding circuit 61-2.

The subtracter 81 subtracts the envelope signal EV-2 from the envelope signal EV-1 to generate a differential signal ED. The differential signal ED is supplied to a control signal output circuit 88 after removing an unnecessary component such as noise component from the differential signal ED by a low pass filter 82.

For example, sine wave oscillation signal Swb, which is a wobbling frequency, is supplied from the oscillating circuit 89, which will be described later, to the multipliers 83, 84. The multipliers 83, 84 multiplies the oscillation signal Swb with the envelope signals EV-1, EV-2 so as to execute wave detection and then, it generates wobbling error signals WE-1, WE-2 for each reproducing head. Further, after an unnecessary component is removed from the wobbling error signals WE-1, WE-2 by the low pass filters 85, 86, the signals are supplied to an adder 87.

The adder 87 sums up the wobbling error signal WE-1 with the wobbling error signal WE-2 so as to generate a wobbling error signal WE for the DT head 50, which is supplied to the control signal output circuit 88.

The control signal output circuit 88 receives the track identification information TID-1, TID-2 from the C1 correcting units 62-1, 62-2. The control signal output circuit 88 generates a control signal DH based on the differential signal ED, the wobbling error signal WE, and the track identification information TID-1, TID-2 and supplies it to an adder 90. The adder 90 is connected to an oscillating circuit 89. The oscillating circuit 89 generates an oscillation signal Swb of wobbling frequency and supplies it to the multipliers 83, 84 and the adder 90 as described above.

The adder 90 adds the oscillation signal Swb to the control signal DH and supplies the obtained addition signal DHW to an operational amplifier 91.

The actuator 93 (for example, Bimorph device) for driving the DT head 50 in the track width direction is provided with a sensor 94 (for example, strain gauge) which generates a signal corresponding to the driving amount of the DT head 50. The amplifier 92 receives and amplifies a sensor signal SEg generated by the sensor 94. The amplifier 92 then supplies it to the operational amplifier 91 as a sensor signal SEh. The operational amplifier 91 generates a driving signal DR based on the sensor signal SEh supplied from the amplifier 92 and the addition signal DHW and supplies it to the actuator 93. This allows the reproduction heads 50-1, 50-2 to be feedback controlled so as to be located at positions based on the control signal DH outputted from the control signal output circuit 88.

FIGS. 8A to 8E are diagrams each for explaining the operation of the driving section 80. In FIG. 8A, the solid line indicates envelope signals EV-1 and the dotted line indicates an envelope signal EV-2. FIG. 8B indicates a differential signal ED, which is obtained by subtracting the envelope signal EV-2 from the envelope signal EV-1. FIG. 8C indicates a track identification information TID-1 and FIG. 8D indicates track identification information TID-2.

Figures 9A, 9B:
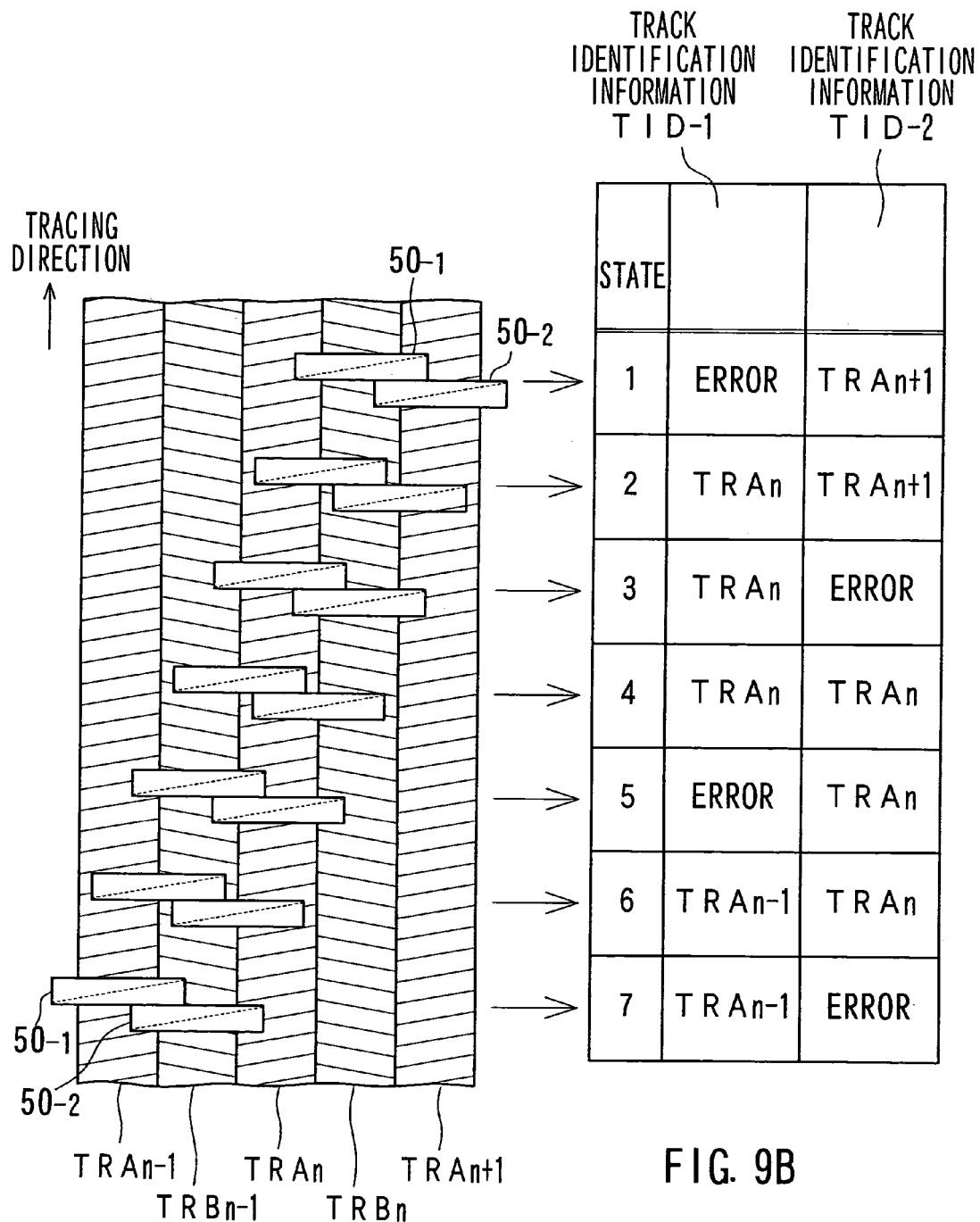
FIGS. 9A and 9B are diagrams each for showing the relationship between a position of the reproducing head and track identification information.

FIGS. 9A and 9B show the relationship between the position of the reproducing head and track identification information. In case of "state 3" in which the reproducing head 50-1 is located in a center of a target track TRAn, track identification information TID-1 in the reproduction data RD-1 indicates the track TRAn. A track TRBn which adjoins the target track TRAn is set to have a different azimuth and the track TRAn which is traced by the reproducing head 50-2 is narrow. Therefore, the signal level of a reproduction signal of the track TRAn is so small that the reproduction data RD-2 cannot be obtained, and consequently, the track identification information TID-2 suffers from an error.

If the with of a track TRAn traced by the reproducing head 50-1 is substantially equal to the width of a track TRAn traced by the reproducing head 50-2 as indicated in the "state 4", not only the track TRAn is indicated by the track identification information TID-1 of the reproduction data RD-1, but also the track TRAn is indicated by the track identification information TID-2 of the reproduction data RD-2.

If the amount of off track is large and the width of the track TRAn-1 traced by the reproducing head 50-1 is substantially equal to the width of the track TRAn traced by the reproducing head 50-2 as indicated in the 'state 6", not only track TRAn-1 is indicated by the track identification information TID-1 of the reproduction data RD-1, but also track TRAn is indicated by the track identification information TID-2 of the reproduction data RD-2. As described above, the track identification information differs depending on the position of the reproducing head.

FIG. 8E shows a wobbling error signal WE. If a target track TRAn is traced by the reproducing head 50-1 and the reproducing head 50-2 as indicated by the "state 4" in FIG. 9, the wobbling error signal WE becomes "0". That is, when the DT head 50 is wobbled in the "state 4", the wobbling error signal WE-1 detected based on the envelope signal EV-1 and the wobbling error signal WE-2 detected based on the envelope signal EV-2 kill each other in terms of their polarities and thus, the wobbling error signal WE becomes "0".

If the DT head 50 suffers from an off track in the direction from the "state 4" to the "state 3" or the "state 5" in FIG. 9, the absolute value of signal level of the wobbling error signal WE increases. For example, if the off track occurs in the direction of the "state 3", a difference in a signal level is generated between the wobbling error signal WE-1 detected based on the envelope signal EV-1 and the wobbling error signal WE-2 detected based on the envelope signal EV-2, so that the signal level of the wobbling error signal WE increases.

If the amount of off track increases further, the absolute value of the signal level in the wobbling error signal WE decreases or increases repeatedly. For example, in case of the "state 2" or the "state 6", the wobbling error signal WE-1 detected based on the envelope signal EV-1 and the wobbling error signal WE-2 detected based on the envelope signal EV-2 are opposite in terms of their polarities and kill each other, so that the wobbling error signal WE becomes "0". That is, if the DT head position is locked by executing the servo operation so that the wobbling error signal WE becomes "0", there is a fear that pseudo lock may occur not only in the "state 4" but also at a position where the off track is generated. Thus, the control signal output circuit 88 squeezes the position of the DT head 50 up to a range in which no pseudo lock is generated using the track identification information TID-1, TID-2 and differential signal ED. The position of the DT head 50 is then controlled to be an optimum position for reproduction of a target track, namely in the "state 4" by executing the servo operation so that the wobbling error signal WE is "0".

Figure 10:
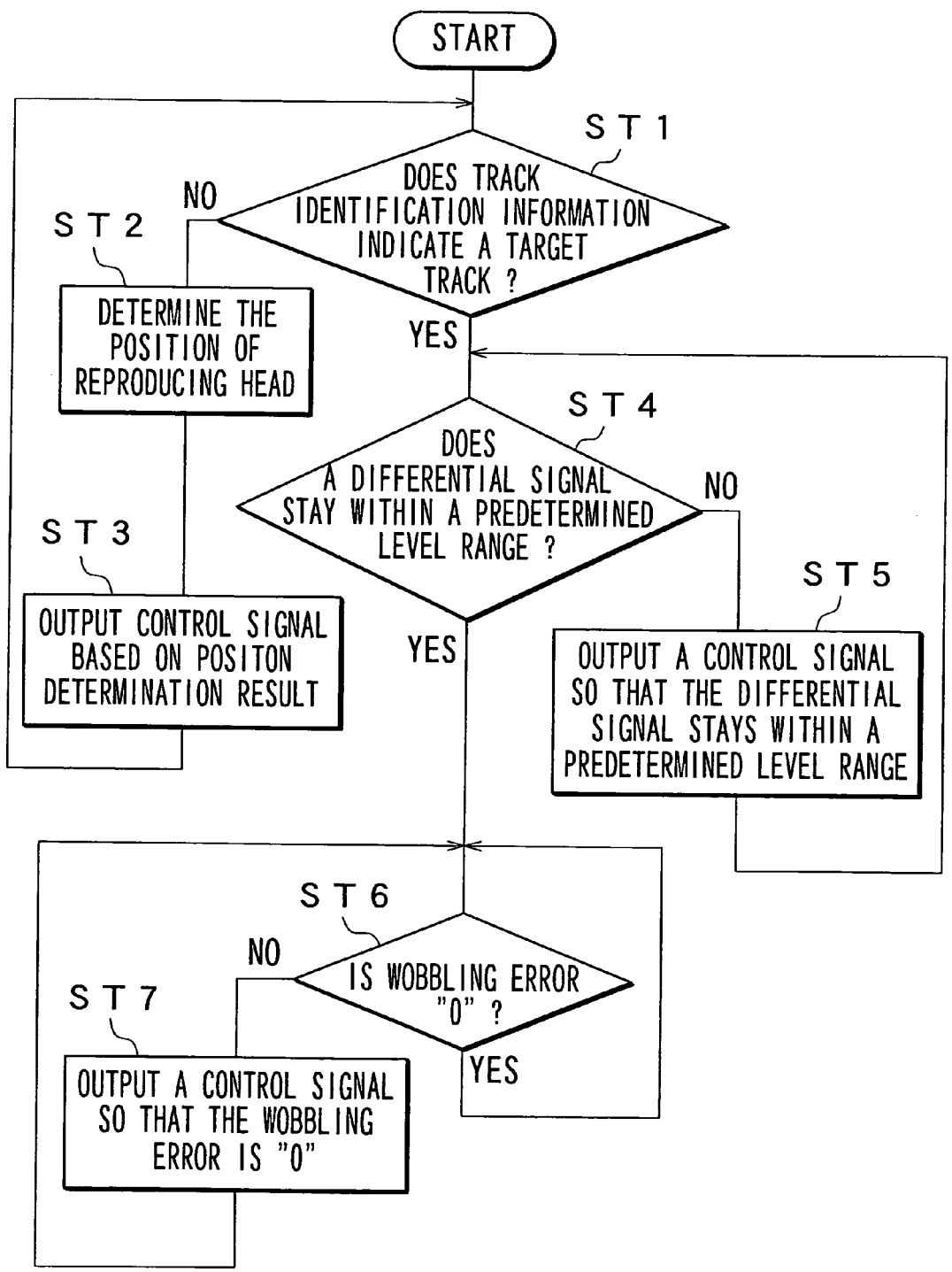
FIG. 10 is a flow chart for explaining operations of the control signal output circuit.

FIG. 10 is a flow chart showing operations of the control signal output circuit 88 for executing the above-described control. In step ST1, it is determined whether the track identification information TID-1, TID-2 indicates a target track. If it does not indicate a target track, the procedure proceeds to step ST2 and if it indicates a target track, the procedure proceeds to step ST4.

In step ST2, the position of the DT head 50 is determined from the values of the track identification information TID-1, TID-2. The relationship between the track identification information and the amount of off track is shown in FIGS. 9A and 9B. Thus, it is determined which position the DT head is located from the values of the track identification information TID-1, TID-2. The procedure proceeds to step ST3.

In step ST3, a moving direction of the DT head 50 is determined or the moving direction and approximate moving amount thereof are determined based on a determination result in step ST2 so as to generate a control signal DH and output it. Then, the procedure returns to step ST1. For example, if the track identification information TID-1 indicates a target track "TRAn" and the track identification information TID-2 indicates a target track "TRAn+1", it is determined that the position of the DT head 50 is a position indicated as "state 2" in step ST2 and a control signal DH for moving the DT head 50 to the position indicated by the "state 4" is generated and outputted. When the control signal DH for moving the DT head 50 to the position indicated by the "state 4" is generated, the moving amount of the DT head 50 is computed based on the track position information or phase information based on track identification information TID-1, TID-2 and a moving speed of the magnetic tape 40 and then, the control signal DH is generated so as to move the DT head 50 only by this computed moving amount. If the control signal DH is generated in this way, the DT head 50 can be moved to the position indicated by the "state 4" even at the time of special reproducing operation.

If the DT head 50 turns into substantially the "state 4", the track identification information TID-1, TID-2 indicate a target track "TRAn" and the procedure proceeds from step ST1 to ST4.

In step ST4, it is determined whether or not the differential signal ED stays within a predetermined level range. This predetermined level range is so set that when DT head 50 is controlled to be moved into a direction that the wobbling error signal WE becomes "0", the moving direction of the DT head 50 can be always restricted to the direction toward the "state 4". For example, as indicated in FIG. 8B, it is determined whether or not the differential signal ED stays within a range of signal level La-Lb. If no differential signal ED stay within the predetermined level range, the procedure proceeds to step ST5. Further, if the differential signal ED stays within the predetermined level range, the procedure proceeds to step ST6.

In step ST5, the control signal DH is generated and outputted so that the differential signal ED stays within the predetermined level range. For example, even if the track identification information TID-1, TID-2 indicates a target track, when the differential signal ED indicates that the position of the DT head 50 is near the "state 5", the control signal DH is generated so as to move the DT head 50 in the direction toward the "state 3" and outputted. When the differential signal ED indicates that the position of the DT head 50 is near the "state 3", the control signal DH is generated so as to move the DT head 50 in the direction toward the "state 5" and outputted and then, the procedure returns to step ST4.

If the absolute value of the differential signal ED turns into a predetermined level range and the procedure proceeds from step ST4 to step ST6 wherein it is determined whether or not the wobbling error signal WE is "0". Here if the signal level of the wobbling error signal WE is "0", the procedure returns to step ST6 and unless the signal level of the wobbling error signal WE is "0", the procedure proceeds to step ST7. In step ST7, the control signal DH is generated so that the wobbling error becomes "0" and outputted. Then, the procedure returns to step ST6.

Because the position of the DT head 50 is controlled so as to trace a target track based on the track identification information TID-1, TID-2 in this embodiment, off track allowance is expanded with the special reproduction function maintained. A plurality of reproducing heads also reproduces a target track quickly. Further, in this embodiment, the position of the DT head 50 is narrowed down and the position of the DT head 50 is controlled so that the wobbling error signal WE becomes "0" after narrowing down of the position by the differential signal ED. This allows the target track to be reproduced quickly at a high precision without generating any problem such as pseudo lock.

Figure 11A:
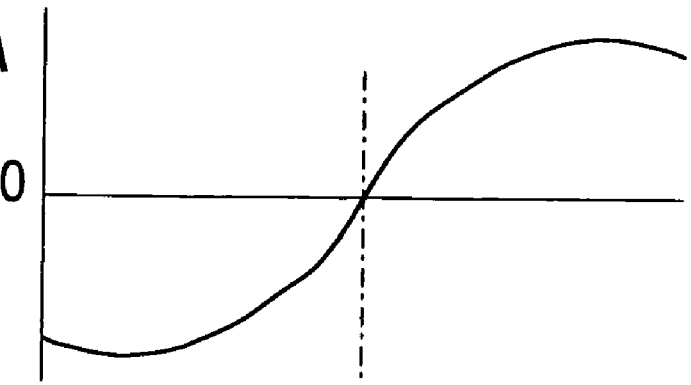
FIGS. 11A to 11C are diagrams each for explaining an operation when off set occurs.
Figure 11B:
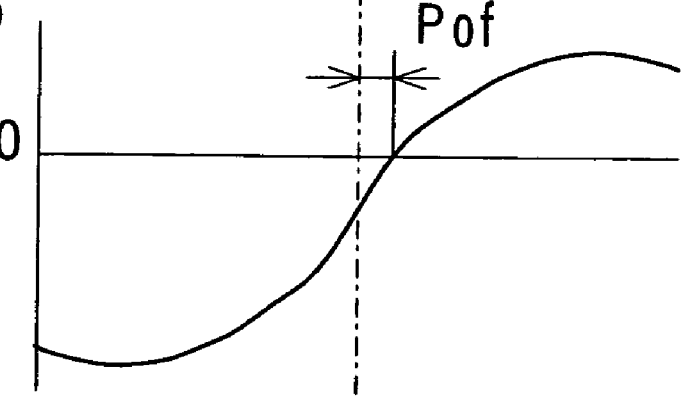
Figure 11C:
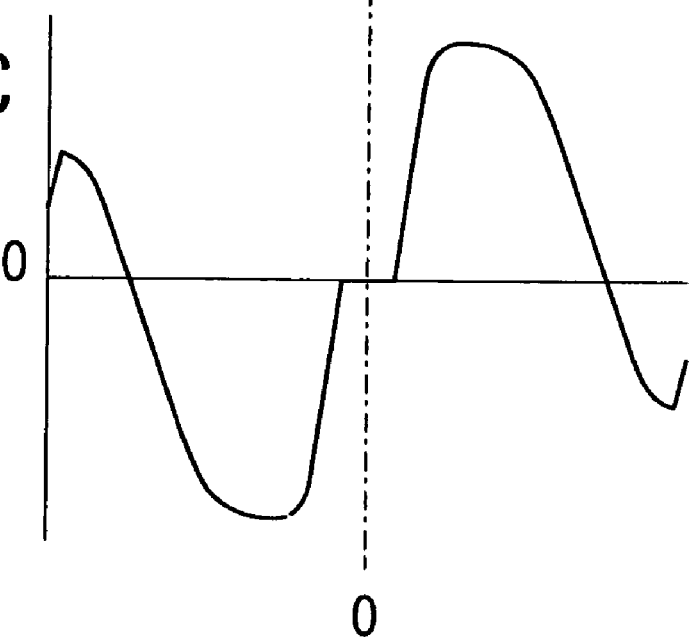

If the output characteristic of the reproducing head 50-1 or reproducing head 50-2 changes when the relationship between the differential signal ED and an amount of off track is adjusted as shown in FIG. 11A, an offset Pof is generated as shown in FIG. 11B even if the differential signal ED is controlled to be "0". However, if the wobbling error signal WE shown in FIG. 11C is controlled to be "0", the DT head 50 reproduces a target track properly.

If within the off track range indicating that both pieces of the track identification information TID-1, TID-2 are target tracks, the DT head 50 can be controlled to an optimum position by the wobbling error signal WE without generating any pseudo lock, the DT head 50 can be controlled to an optimum position at high precision without use of any differential signal. This permits the structure thereof to be simplified.

The differential signal ED is obtained quickly by computing a differential between the envelope signal EV-1 and the envelope signal EV-2. On the other hand, the wobbling error signal WE is generated by multiplying the envelope signals EV-1, EV-2 by the oscillation signal Swb. It takes a long time to generate the wobbling error signal WE because the oscillation signal Swb cannot be set to a high frequency as it is used for driving the actuator 93. Thus, if the position of the DT head 50 is narrowed down based on the differential signal ED as described above, the DT head 50 can be located at an optimum position quickly.

Figure 12:
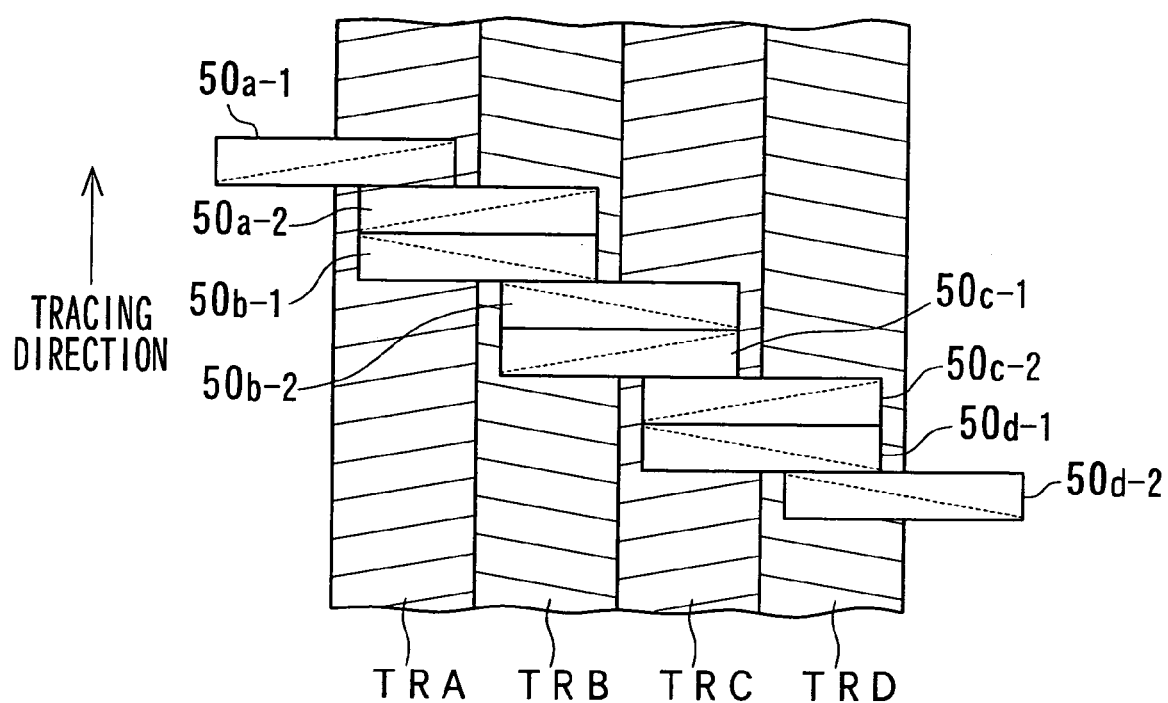
FIG. 12 is a diagram for showing a case where a plurality of tracks is traced simultaneously.

In the above embodiment, a case of tracing a single track at a time has been described. If a plurality of tracks is traced at a time, for example, four tracks are traced at the same time as indicated in FIG. 12, a plurality of reproducing heads is provided for each track such that they deviate in the track width direction. That is, reproducing heads 50*a*-1, 50*a*-2 are provided corresponding to track TRA; reproducing heads 50*b*-1, 50*b*-2 are provided corresponding to track TRB; reproducing heads 50*c*-1, 50*c*-2 are provided corresponding to track TRC; and reproducing heads 50*d*-1, 50*d*-2 are provided corresponding to track TRD. If the DT head constituted of these reproducing heads is controlled in the above described way, the DT head 50 can be located at an optimum position even if the plurality of tracks are traced at the same time, just as a single track is traced.

If such tracks are traced at the same time, the DT head 50 may be controlled based on the reproduction signal from a single track as described above. Further, it is permissible to obtain track identification information, differential signal, and wobbling error signal for each track so as to control the DT head 50 to the most suitable position. If the track identification information, differential signal, and wobbling error signal are obtained for each track so as to control the trace position, the DT head 50 can be controlled to any appropriate position even if a signal from any track cannot be read out properly.

Whether or not an inclination or a curve occurs in the track can be determined according to the differential signal. That is, if the track has an inclination, for example, the differential signal at a track starting section is a value on positive pole, the differential signal in the track center section is "0" and the differential signal at the track termination section is a value on negative pole. If the track is curved, for example, the differential signals at the track starting section and track termination section are values on positive pole and the differential signal in the track center section is "0" or a value on negative pole. Thus, if not only the reproducing head is controlled to a predetermined off track range using the differential signal as described above, but also an inclination or a curve of the track is determined based on the differential signal and the tracing position is corrected corresponding to that determination result, a target track can be traced easily.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for reproducing recorded signal comprising: a head assembly including a plurality of reproducing heads for each track, said reproducing heads deviating from each other in a track width direction; a driving device for driving said head assembly in said track width direction; and a reproduction signal processor for detecting track identification information of a traced track according to a reproduction signal obtained by said plurality of reproducing heads for each of said reproducing heads, wherein said driving device drives said head assembly in said track width direction using said track identification information and said plurality of reproducing heads trace a target track, wherein said driving device wobbles said head assembly at a predetermined amplitude in said track width direction; wherein said reproduction signal processor generates envelope signals for the reproduction signals obtained by said plurality of reproducing heads; and wherein, after driving said head assembly in said track width direction using said track identification information, said driving device further drives said head assembly in said track width direction to eliminate a wobbling error detected using said envelope signals.

2. An apparatus for reproducing recorded signal comprising: a head assembly including a plurality of reproducing heads for each track, said reproducing heads deviating from each other in a track width direction a driving device for driving said head assembly in said track width direction; and a reproduction signal processor for detecting track identification information of a traced track according to a reproduction signal obtained by said plurality of reproducing heads for each of said reproducing heads, wherein said driving device drives said head assembly in said track width direction using said track identification information and said plurality of reproducing heads trace a target track, wherein said driving device wobbles said head assembly at a predetermined amplitude in said track width direction; wherein said reproduction signal processor generates envelope signals for the reproduction signals obtained by said plurality of reproducing heads; and wherein, after obtaining a differential in said envelope signals and driving said head assembly in said track width direction using said track identification information, said driving device drives said head assembly in said track width direction to limit said differential to a predetermined range.

3. The apparatus for reproducing recorded signal according to claim 2, wherein after driving said head assembly in said track width direction to limit said differential to the predetermined range, said driving device further drives said head assembly in said track width direction to eliminate a wobbling error detected using said envelope signals.

4. A method for reproducing recorded signal wherein a head assembly includes a plurality of reproducing heads for a track, said reproducing heads deviating from each other in a track width direction, said method comprising the steps of: detecting track identification information of a traced track according to a reproduction signal obtained by said plurality of reproducing heads for each of said reproducing heads; and driving said head assembly in said track width direction using said track identification information for said plurality of reproducing heads to trace a target track; wobbling said head assembly at a predetermined amplitude in said track width direction; generating envelope signals for reproduction signals obtained by said plurality of reproducing heads; and after driving said head assembly in said track width direction using said track identification information, further driving said head assembly in said track width direction to eliminate a wobbling error detected using said envelope signals.

5. A method for reproducing recorded signal wherein a head assembly includes a plurality of reproducing heads for a track, said reproducing heads deviating from each other in a track width direction, said method comprising the steps of: detecting track identification information of a traced track according to a reproduction signal obtained by said plurality of reproducing heads for each of said reproducing heads; and driving said head assembly in said track width direction using said track identification information for said plurality of reproducing heads to trace a target track; wobbling said head assembly at a predetermined amplitude in said track width direction; generating envelope signals for reproduction signals obtained by said plurality of reproducing heads; and after obtaining a differential in said envelope signals and driving said head assembly in said track width direction using said track identification information, further driving said head assembly in said track width direction to limit said differential to a predetermined range.

6. The method for reproducing recorded signal according to claim 5, further comprising the step of, after driving said head assembly in said track width direction to limit said differential to the predetermined range, further driving said head assembly in said track width direction to eliminate a wobbling error detected using said envelope signals.

* * * * *